United States Patent
Sheridon

(10) Patent No.: US 6,480,321 B2
(45) Date of Patent: Nov. 12, 2002

(54) CONTROLLING ENGULFING AND SEQUESTERING MAGNETIC PADS

(75) Inventor: Nicholas K. Sheridon, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/749,560

(22) Filed: Dec. 28, 2000

(65) Prior Publication Data

US 2002/0085263 A1 Jul. 4, 2002

(51) Int. Cl.⁷ .................... G02B 26/00; G09G 3/34
(52) U.S. Cl. .................... 359/296; 345/84; 345/107
(58) Field of Search .................... 359/296; 345/84, 345/85, 107; 428/323, 327, 402.21, 407; 264/4.7

(56) References Cited

U.S. PATENT DOCUMENTS

| | | |
|---|---|---|
| 5,717,514 A | 2/1998 | Sheridon |
| 5,739,801 A | 4/1998 | Sheridon |
| 5,767,826 A | 6/1998 | Sheridon et al. |
| 6,067,185 A * | 5/2000 | Albert et al. ............... 359/296 |
| 6,243,058 B1 * | 6/2001 | Mikkelsen et al. ........... 345/84 |
| 6,262,833 B1 * | 7/2001 | Loxley et al. .............. 359/296 |

* cited by examiner

Primary Examiner—Georgia Epps
Assistant Examiner—Tuyen Tra
(74) Attorney, Agent, or Firm—Oliff & Berridge, PLC

(57) ABSTRACT

Gyricon balls are provided with magnetic pads that allows them to be located into two different positions by means of a further stationary magnetic pad. The magnetic pads are engulfed and sequestered from sight so they do not decrement the brightness of the display. The magnetic pads are made by dispersing magnetic pigments into the polyethylene plastic. The addition of aluminum octoate to one hemisphere of the gyricon ball causes the pigmented plastic on that side of the ball to attempt to envelope the pigmented plastic on parts of the ball that does not have aluminum octoate added during the ball making process.

14 Claims, 2 Drawing Sheets

CONTROLLING ENGULFING AND SEQUESTERING MAGNETIC PADS

BACKGROUND OF THE INVENTION

1. Field of Invention

The invention relates to the field of visual displays. More particularly, the invention relates to the production of balls used in a gyricon or twisting ball visual display and to the production of gyricon balls having sequestered magnetic pads.

2. Description of Related Art

Paper has traditionally been a preferred medium for the presentation and display of text and images. Paper has several characteristics that make it a desirable display medium, including the fact that it is lightweight, thin, portable, flexible, foldable, high-contrast, low-cost, relatively permanent, and readily configured into a myriad of shapes. It can maintain its displayed images without using any electricity. Paper can also be read in ambient light and can be written or marked upon with a pen, pencil, paintbrush, or any number of other implements, including a computer printer.

Unfortunately, paper is not well suited for real-time display purposes. Real-time imagery from computer, video, or other sources cannot be displayed directly with paper, but must be displayed by other means, such as by a cathode-ray tube (CRT) display or a liquid-crystal display (LCD). However, real-time display media lack many of the desirable qualities of paper, such as physical flexibility and stable retention of the displayed image in the absence of an electric power source.

Electric paper combines the desirable qualities of paper with those of real-time display media. Like ordinary paper, electric paper can be written and erased, can be read in ambient light and can retain imposed information in the absence of an electric field or other external retaining force. Also like ordinary paper, electric paper can be made in the form of a light-weight, flexible, durable sheet that can be folded or rolled into a tubular form about any axis and placed into a shirt or coat pocket, and then later retrieved, re-straightened, and read without loss of information. Yet unlike ordinary paper, electric paper can be used to display full-motion and other real-time imagery as well as still images and text. Thus, electric paper can be used in a computer system display screen or a television.

The gyricon, also called the twisting-ball display, rotary ball display, particle display, dipolar particle light valve, etc., provides a technology for making electric paper. A gyricon display is a display that can be altered or addressed. A gyricon display is made up of a multiplicity of optically anisotropic balls which can be selectively rotated to present a desired surface to an observer.

The optical anisotropy of the gyricon balls is provided by dividing the surface of each gyricon ball into two portions. One portion of the surface of each gyricon ball has a first light reflectance or color. The other portion of the surface of the gyricon ball has a different color or a different light reflectance. For example, a gyricon ball can have two distinct hemispheres, one black and the other white. Additionally, each hemisphere can have a distinct electrical characteristic with respect to a dielectric fluid. Accordingly, the gyricon balls are electrically as well as optically anisotropic. The black-and-white gyricon balls are embedded in a sheet of optically transparent material, such as an elastomer layer, that contains a multiplicity of spheroidal cavities. Each of the spheroidal cavities is permeated by a transparent dielectric fluid, such as a plasticizer. The fluid-filled cavities accommodate the gyricon balls, one gyricon ball per cavity, to prevent the balls from migrating within the sheet. Each cavity is slightly larger than the size of the gyricon ball so that each gyricon ball can rotate or move slightly within its cavity.

A gyricon ball can be selectively rotated within its respective fluid-filled cavity by applying an electric field, so that either the black or white hemisphere of the gyricon ball is exposed to an observer viewing the surface of the sheet. By applying an electric field in two dimensions, for example, using a matrix addressing scheme, the black and white sides of the balls can be caused to appear as the image elements, e.g., pixels or subpixels, of a displayed image.

SUMMARY OF THE INVENTION

The various exemplary embodiments of the systems and methods of this invention are directed to addressing gyricon displays in which magnetic materials are added to the composition of the gyricon balls and magnetic fields are used to augment the usual electrical addressing fields.

The various exemplary embodiments of the systems and methods of this invention are directed to making gyricon balls with magnetic pads that allows them to be located into two different positions by means of a further stationary magnetic pad. This allows creation of a strong, engineered threshold for gyricon ball rotation, rather than depending upon the naturally occurring threshold.

The various exemplary embodiments of the systems and methods of this invention are directed to sequestering, i.e., hiding, the magnetic pads from sight so they do not decrement the brightness of the display.

The various exemplary embodiments of the systems and methods of this invention are further directed to controlling the engulfing of one hemisphere of a bichromal ball by the other hemisphere of the bichromal ball during the fabrication of the bichromal ball.

In the various exemplary embodiments of the systems and methods of this invention, the magnetic pads, which may be dark in color and which may subtend a substantial part of the visible portion of the white side of the gyricon ball, are sequestered.

In the various exemplary embodiments of the systems and methods of this invention, the gyricon balls are made from a polyethylene plastic, wherein the white sides of the balls are made from this plastic, with titanium dioxide dispersed within, and the black sides of the balls are made from this same plastic, with a black pigment, as well as a chemical called a charging agent, dispersed in within.

In the various exemplary embodiments of the systems and methods of this invention, the magnetic pads are made by dispersing magnetic pigments into the polyethylene plastic.

In the various exemplary embodiments of the systems and methods of this invention, the magnetic pads on the white sides of the gyricon balls are sequestered.

In the various exemplary embodiments of the systems and methods of this invention, the addition of aluminum octoate to either the white side of the gyricon ball or the black side of the gyricon ball causes the pigmented plastic on that side of the ball to attempt to envelope the pigmented plastic on parts of the ball that do not have aluminum octoate added during the ball making process.

In the various exemplary embodiments of the systems and methods of this invention, adding aluminum octoate to the white pigmented plastic causes the magnetic pads on the white sides of the gyricon balls to be enveloped during the ball making process.

In the various exemplary embodiments of the systems and methods of this invention, adding aluminum octoate to the pigmented plastic used to make a first hemisphere of a bichromal ball substantially reduces the likelihood that the pigmented plastic from the second hemisphere of the ball will envelop the first hemisphere, enabling combinations of pigments to be used in the fabrication of bichromal balls that otherwise would undergo engulfing.

BRIEF DESCRIPTION OF THE DRAWINGS

The exemplary embodiments of the invention will be described in detail, with reference to the following figures in which.

DETAILED DESCRIPTION OF PREFERRED EMBODIMENTS

The exemplary embodiments of the systems and methods of this invention are directed to addressing gyricon displays in which magnetic materials are added to the composition of the gyricon balls, and magnetic fields are used to augment the usual electrical addressing fields.

Figure 1:
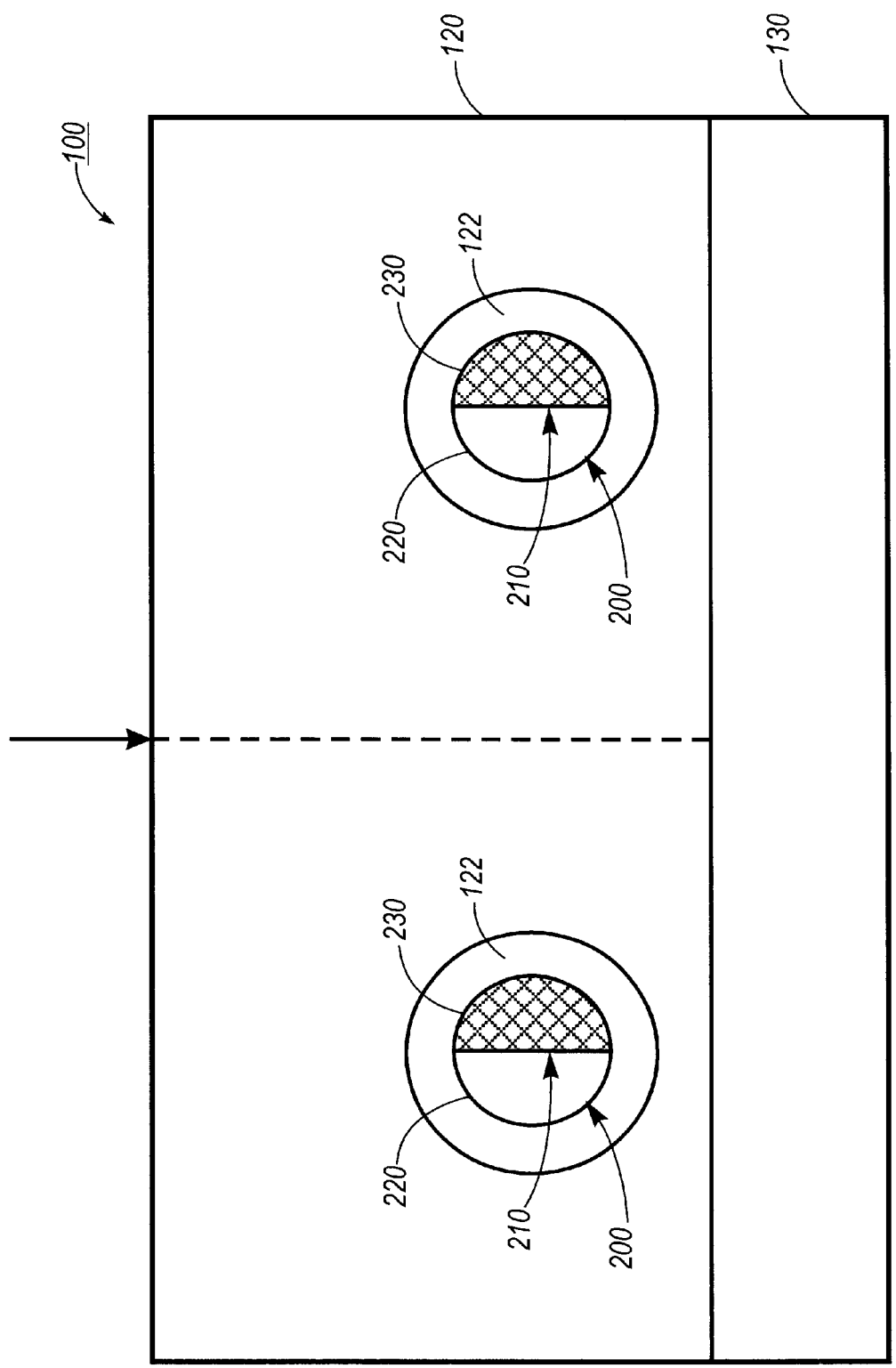
FIG. 1 shows a cross-section of one exemplary embodiment of an electric paper of this invention.

FIG. 1 shows a cross-sectional view of one exemplary embodiment of a sheet 100 of electric paper according to the invention. Specifically, as shown in FIG. 1, a conductive base substrate 130 forms the base substrate of the sheet 100 of electric paper. A gyricon substrate 120 is formed over the conductive base substrate 130. The gyricon substrate 120 includes gyricon balls 200 disposed within the substrate. Each gyricon ball 200 has two distinct hemispheres 220 and 230, one black and the other white, and each hemisphere 220 and 230 has a distinct electrical characteristic, e.g., a zeta potential with respect to a dielectric fluid, so that the gyricon balls 200 are electrically as well as optically anisotropic.

The gyricon balls 200 are embedded in a sheet of optically transparent material, such as an elastomer layer, that makes up the gyricon substrate 120. The gyricon substrate 120 also contains a multiplicity of spheroidal cavities 122 and is permeated by a transparent dielectric fluid, such as a plasticizer. The fluid-filled spheroidal cavities 122 accommodate the gyricon balls 200. In particular, there is one gyricon ball 200 per cavity 122 in the gyricon substrate 120. The spheroidal cavities prevent the gyricon balls 200 from migrating within the gyricon substrate 120. Each gyricon ball 200 can be selectively rotated within in its respective fluid-filled cavity 122 by applying an electric field to present either the black hemisphere 230 or the white hemisphere 220 to an observer viewing the surface of the sheet 100. Thus, applying an electrical field that is adjustable in two dimensions causes the black and white hemispheres 230 or 220 of the gyricon balls 200 to appear as image elements, i.e., subpixels or pixels of a display.

As shown in FIG. 1, a segment line 210 divides the gyricon ball 200 into the two separate hemispheres 230 and 220. The white hemisphere 220 is made using a white pigment. The black hemisphere 230 is made using a black pigment. The gyricon ball 200 can thus either display a white or black face depending on its orientation with respect to a surface of the sheet 100.

Although only two gyricon balls 200 are shown in FIG. 1, it should be understood that the gyricon substrate 120 may include a very large number of gyricon balls 200, depending on the resolution desired. Further, although the gyricon balls 200 are described as having two sections, one black hemisphere and one white hemisphere, it should be understood that each gyricon ball 200 may have more than two segments and may be any two or more-colors, not just black and white.

Each of the black and white hemispheres 230 and 220 has a distinct electrical characteristic, e.g., a zeta potential with respect to a dielectric fluid, so that the gyricon balls 200 are electrically as well as optically anisotropic. The gyricon balls 200 are embedded in a sheet of optically transparent material, such as an elastomer layer, that makes up the gyricon substrate 120.

Figure 2:
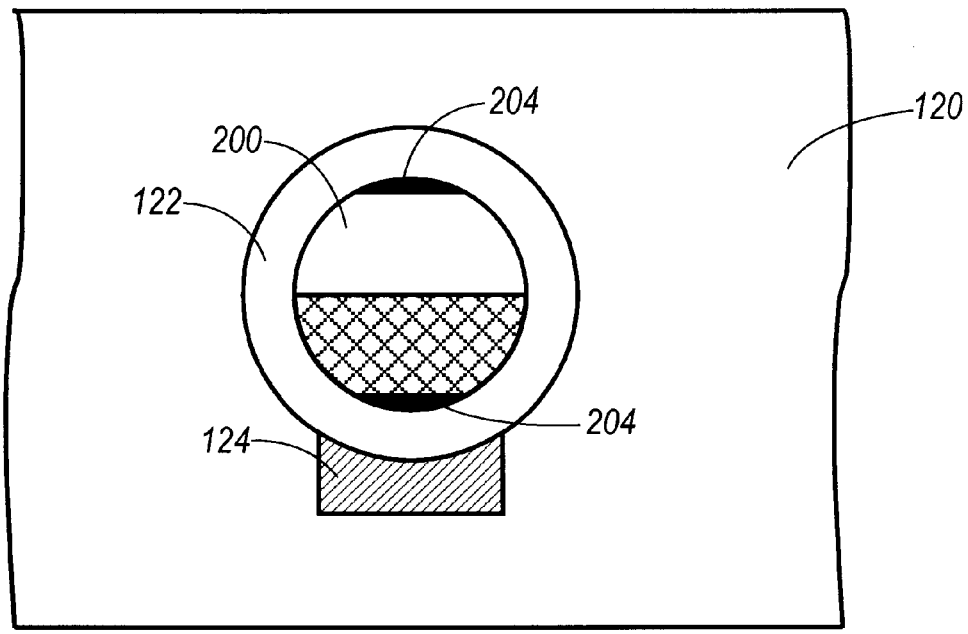
FIG. 2 shows in greater detail one exemplary embodiment of the gyricon substrate of FIG. 1.

FIG. 2 shows in greater detail one exemplary embodiment of the gyricon substrate 120. As shown in FIG. 2, in the fluid-filled spheroidal cavity 122, there is a stationary magnetic pad 124 made from high permeability materials, i.e., materials that have ferro-magnetic properties but little residual magnetism when the external field is removed.

The gyricon ball 200 is made from materials that, for example, develop electrical potentials in contact with the liquid and in the presence of the electrical field, so that one of the hemispheres 230 and 220 of the gyricon ball 200 will develop a different electrical potential than the other side. As shown in FIG. 2, the gyricon ball 200 includes two magnetic pole pieces 204 that allow the gyricon ball 200 to be located into two different positions by means of the stationary magnetic pad 124 adjacent to the cavity 122. This allows creation of a strong, engineered threshold for gyricon ball rotation, rather than depending upon the naturally occurring threshold that is neither well understood nor presently controllable. If the magnetic pad 124 is not permanently magnetized, then the magnetic pole pieces 204 must be permanently magnetized. Similarly, if the magnetic pole pieces 204 is not permanently magnetized, then the magnetic pad 124 must be permanently magnetized.

When the magnetic pole piece 204 in the black hemisphere 230 of the gyricon ball 200 is adjacent to the stationary magnetic pad 124 embedded in the cavity wall 122, there will be a strong mechanical force tending to hold the gyricon ball 200 in place. This is because the distance between the magnetized portion of the gyricon ball 200 and the stationary magnetic pad 124 is very short. This magnetic force will not only cause the gyricon ball 200 to be attached to the cavity wall 122, but it will also require a larger electrical field than otherwise to cause the gyricon ball 200 to start to rotate in the cavity 122. Once the gyricon ball 200 has rotated a short distance, it will experience a much reduced force due to the stationary magnetic pad 124 and its motion will be dominated by the electrical field.

Thus, if the electrical field initially aligns the gyricon ball 200 in its cavity 122 in an orientation in which the black hemisphere 230 is adjacent to the stationary magnetic pad 124, a strong electrical field will be required to subsequently initiate rotation. By controlling the degree of magnetization of the magnetic pole piece 204 in the black hemisphere 230 of the gyricon ball 200, the threshold value of electrical field require to initiate ball rotation can be made to satisfy the requirements of passive addressing. It should be appreciated that, if the black hemisphere 230 is not magnetized, then the degree of magnetization of the stationary magnetic pad 124 is controlled instead. When the gyricon ball 200 is oriented with the white hemisphere 220 adjacent to the stationary magnetic pad 124, the magnetic pole piece in the white hemisphere 220 will be held against the cavity wall 122 by its magnetic attraction to the stationary magnetic pad 124.

It should be appreciated that the gyricon ball 200 may be fabricated using any known process. For example, the gyricon ball 200 can be fabricated using a multiple rotating disk apparatus as described in U.S. Pat. No. 5,767,826 to Sheridon, incorporated herein by reference in its entirety. A magnetic pigment similar to that used in manufacturing magnetic tapes, for example, may be used in the magnetic pole pieces 204, either alone or in combination with other pigments. These magnetic pole pieces 204 would be permanently magnetized with the gyricon ball 200 in a given orientation, possibly in flight from the disk during their manufacture.

The stationary magnetic pad 124 in the wall of the cavity 122 may be fabricated by mixing the magnetized gyricon ball 200 with a high permeability powder, so that the particles would cluster around the magnetized portion of the black hemisphere 230. Surplus particles would be removed and the gyricon ball 200 would be mixed with a liquid resin that would later be cured into a tough silicone elastomer. The high permeability particles would now be incorporated into the elastomer matrix in the vicinity of the magnetized portion of the gyricon ball 200.

In accordance with various exemplary embodiments of this invention, the gyricon ball 200 is made from a polyethylene plastic as described in U.S. Pat. No. 5,717,514 to Sheridon, for example. The white hemisphere 220 is made from this plastic, with titanium dioxide dispersed in it. The black hemisphere 230 is made from this same plastic, with a black pigment dispersed in it, as well as a chemical called a charging agent.

As shown in FIG. 2, the gyricon ball 200 contained in the elastomer cavity 122 is provided with two magnetic pole pieces 204. As shown in FIG. 2, the magnetic pad 124 latches the gyricon ball 200 into one of two stable rotational positions via the two magnetic pole pieces 204. The magnetic pole piece 204 located in the white hemisphere 220, which may be dark in color, may subtend a substantial part of the visible portion of the white hemisphere 220 of the gyricon ball 200. This would greatly reduce the whiteness and the contrast of the gyricon display.

It is desirable to sequester the magnetic pole piece 204 located in the white hemisphere 220 of this gyricon ball 200 without substantially moving the magnetic pole piece 204 from its intended position. This can be done by causing the magnetic pole piece 204 to be covered with a quantity of white pigmented plastic. This can be done by causing the white pigmented plastic of the white hemisphere 220 to engulf the black magnetic pigmented plastic of the magnetic pole piece 204.

It is further desirable to increase the number of pigment combinations that can be generally used to fabricate liquid beads using a spinning disk as described in U.S. Pat. No. 5,767,826 to Sheridon, for example, and before the liquid beads have had a chance to cool and solidify into gyricon balls. It is to be appreciated that some combinations of pigments will result in the production of liquid beads in which one of the pigmented plastics has partially or completely flowed over and engulfed the other pigmented plastic during the gyricon ball making process.

In obtaining liquid beads used in the fabrication of the gyricon balls, many materials packages yield liquid beads in which one pigmented plastic will tend to flow over another pigmented plastic. This may result in liquid beads in which one color hemisphere will be larger than the other color hemisphere. Accordingly, one color may be completely submerged beneath the other color, so that a liquid bead appears to consist of a single color of plastic. This process is called engulfing which may occur after a liquid bead is formed from the spinning disk, and before the liquid bead has had a chance to cool and solidify into the gyricon ball.

Engulfing may occur due to an instability in the liquid bead after it is formed, which may include hydrodynamic instability. Engulfing may be reduced by operating the gyricon ball making apparatus, and thus the molten pigmented plastics, at lower temperatures. As a liquid bead moves through the air from the breakup of the ligament extending from the edge of the disk, the liquid bead cools by exchanging heat with the ambient air. Thus, the processes responsible for engulfing are shortened by the faster freezing of the liquid ball components.

Figure 3:
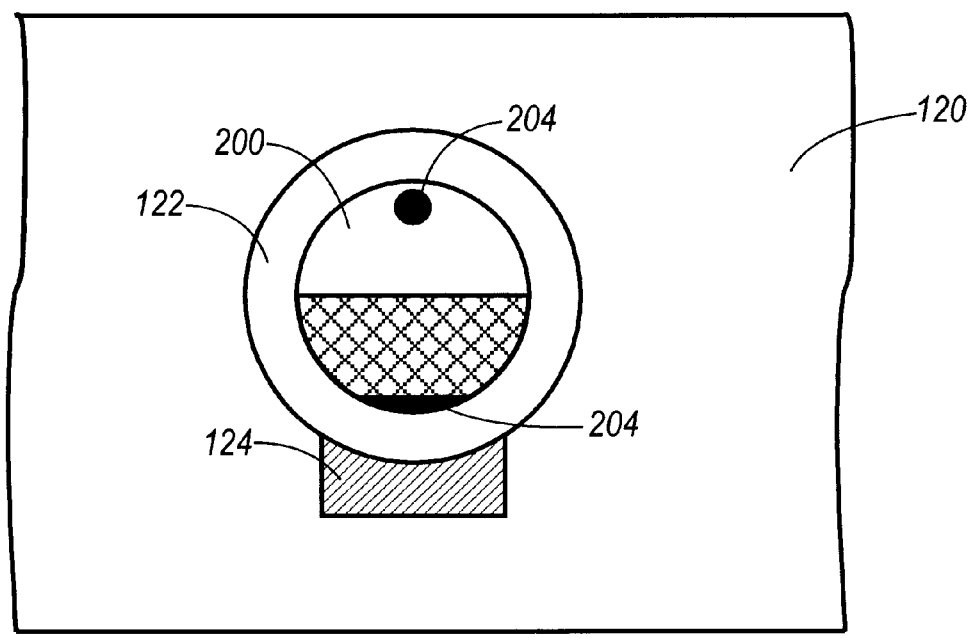
FIG. 3 shows in greater detail one exemplary embodiment of the gyricon substrate having sequestered gyricon balls.

In the various exemplary embodiments of the systems and methods of this invention, engulfing and sequestering the magnetic pad 124 on the white hemisphere 220 of the gyricon ball 200 is provided. The magnetic pads 124 are made by dispersing magnetic pigments into the polyethylene plastic. The addition of aluminum octoate to either the white hemisphere 220 of the gyricon ball 200 or the black hemisphere 230 of the gyricon ball 200 will cause the pigmented plastic on that side of the gyricon ball 200 to attempt to envelope the pigmented plastic on parts of the gyricon ball 200 that does not have aluminum octoate added during the ball making process. Hence, adding aluminum octoate to the white pigmented plastic will cause it to envelope the magnetic pad 124 on the white hemisphere 220 of the gyricon ball 200, as shown in FIG. 3. The magnetic pad 124 so engulfed will now be sequestered under the surface of the gyricon ball, greatly reducing its deleterious effects on the optical properties of the gyricon display.

It should be appreciated that it may also be necessary to add aluminum octoate to the black hemisphere 230 of the gyricon ball 200 to nullify the attempt of the white hemisphere 220 of the gyricon ball 200 to engulf the black hemisphere 230 of the gyricon ball 200. In this manner, the magnetic pad 124 will remain localized near the poles of the gyricon ball 200, but submerged and not very visible.

If aluminum octoate is added to a first pigmented polyethylene liquid and the liquid is subsequently used to make liquid beads in conjunction with a second pigmented polyethylene liquid, and if the first liquid without the aluminum octoate added has a tendency to engulf the second liquid then with the aluminum octoate added, then there is substantially less tendency for engulfing to occur. As still more aluminum octoate is added, there is even less tendency for engulfing to occur. As even more aluminum octoate is added, a tendency develops for the second liquid to engulf the first liquid.

For example, gyricon balls made using 20% R104 titanium dioxide by DuPont dispersed in Polywax 1000 polyethylene (by Baker Petrolite Corp.) for the white hemisphere of the gyricon ball and 2.5% Columbian Chemicals #7006 carbon black and 1% 5175 (an acetate ester by the Baker Petrolite Corp.) dispersed in Polywax 1000 for the black hemisphere of the gyricon ball may suffer severe engulfing of the black hemisphere of the gyricon ball by the white pigmented plastic. In one exemplary embodiment, adding 0.2% aluminum octoate to the black hemisphere of the gyricon ball may reduce or eliminate the white engulfing. Increasing the amount of aluminum octoate added to the black hemisphere of the gyricon ball to 1% may cause severe engulfing of the white side of the ball by the black pigmented plastic. Hence, the addition of aluminum octoate may effectively control the engulfing discussed.

In various exemplary embodiments, aluminum octoate may be used to increase viscosity or as a gelling agent. It is to be appreciated that, with various pigmented polyethylene systems, a lower viscosity liquid will tend to engulf a higher viscosity liquid during the liquid bead making process.

It should be appreciated that though aluminum octoate is discussed in the above exemplary embodiments, other chemicals may also be used which have an effect on engulfing. Such chemicals include but are limited to the aluminum stearates.

In the above exemplary embodiments, aluminum octoate is applied to provide a chemical control of engulfing. Thus, a method of at least partially controlling the engulfing of one liquid by another during the production of gyricon balls is obtained.

It should be appreciated that though gyricon balls are discussed in the above exemplary embodiments, this invention is not limited to gyricon balls. That is, the methods and apparatus may include the production of gyricon bichromal balls as described above, and other gyricon balls generally referred to as optically transmissive balls. The optically transmissive balls are described in U.S. Pat. No. 5,739,801 to Sheridon, for example.

The invention has been described in relation to a gyricon display. However, the principles it illustrates can be equally well applied to many other high impedance displays, such as certain liquid crystal displays and electrophoretic displays.

While the invention has been described in conjunction with the preferred embodiments it is described above, as evident that many alternatives, modifications, and variations are apparent to those skilled in the art. Accordingly, the preferred embodiments in the invention set forth above are intended to be illustrative and not limiting. Various changes may be made without departing from the spirit and scope of the invention.

What is claimed is:

1. A display device, comprising:
   a gyricon layer comprising a plurality of cavities, each cavity having a magnetic pad positioned therein; and
   a plurality of gyricon balls respectively disposed in the cavities of the gyricon layer, each gyricon ball comprising at least a first portion of a first pigment with a first magnetic pole piece provided therein, and a second portion of a second pigment with a second magnetic pole piece provided therein, wherein said first magnetic pole piece is sequestered by the first pigment.

2. The display device of claim 1, wherein said first portion comprises aluminum octoate.

3. A display device, comprising:
   a gyricon layer comprising a plurality of cavities, each cavity having a magnetic pad positioned therein; and
   a plurality of gyricon balls respectively disposed in the cavities of the gyricon layer, each gyricon ball comprising at least a first portion of a first pigment with a first magnetic pole piece provided therein, and a second portion of a second pigment with a second magnetic pole piece provided therein, wherein said first pigment engulfs said second pigment.

4. The display device of claim 3, wherein said first pigment comprises aluminum octoate.

5. A method of forming a display device, comprising:
   forming a gyricon layer comprising a plurality of cavities, each cavity having a magnetic pad positioned therein; and
   respectively disposing a plurality of gyricon balls in the cavities of the gyricon layer, each gyricon ball comprising at least a first portion of a first pigment with a first magnetic pole piece provided therein, and a second portion of a second pigment with a second magnetic pole piece provided therein, wherein said first magnetic pole piece is sequestered by the first pigment.

6. The method of claim 5, wherein said first pigment comprises aluminum octoate.

7. A method of forming a display device, comprising:
   forming a gyricon layer comprising a plurality of cavities, each cavity having a magnetic pad positioned therein; and
   respectively disposing a plurality of gyricon balls in the cavities of the gyricon layer, each gyricon ball comprising at least a first portion of a first pigment with a first magnetic pole piece provided therein, and a second portion of a second pigment with a second magnetic pole piece provided therein, wherein said first pigment engulfs said second pigment.

8. The method of claim 7, wherein said first pigment comprises aluminum octoate.

9. The method of claim 7, wherein said first pigment engulfs said second pigment before solification.

10. A display device, comprising:
    a layer comprising a plurality of cavities;
    a plurality of gyricon balls respectively disposed in the cavities of the layer, each gyricon ball comprising at least a first portion of a first pigment and a second portion of a second pigment, wherein a chemical compound controls engulfing of one of the first portion and the second portion over another of the first portion and the second portion during ball fabrication.

11. The display device of claim 10. wherein said chemical compound is aluminum octoate.

12. The display device of claim 10, wherein one of said first portion and second portion does not comprise pigments.

13. A display device, comprising:
    a layer comprising a plurality of cavities; and
    a plurality of gyricon balls rotatably disposed in the cavities of the layer, said gyricon balls comprising aluminum octoate.

14. The display device of claim 13, wherein said gyricon balls comprising aluminum stearate.

* * * * *